US005978591A

United States Patent [19]
Bartholomew et al.

[11] Patent Number: 5,978,591
[45] Date of Patent: Nov. 2, 1999

[54] PERSONAL INFORMATION DEVICE AND METHOD FOR DOWNLOADING REPROGRAMMING DATA FROM A COMPUTER TO THE PERSONAL INFORMATION DEVICE VIA THE PCMCIA PORT OR THROUGH A DOCKING STATION WITH BAUD RATE CONVERSION MEANS

[75] Inventors: Paul R. Bartholomew, Eastampton; Mark M. Todorovich, Medford Lakes, both of N.J.

[73] Assignee: Franklin Electronics Publishers, Inc., Burlington, N.J.

[21] Appl. No.: 09/028,367

[22] Filed: Feb. 24, 1998

[51] Int. Cl.$^6$ ...................................................... G06F 9/445
[52] U.S. Cl. ............................................ 395/712; 710/129
[58] Field of Search ........................... 395/712; 235/492; 710/129; 455/186.1; 375/220

[56] References Cited

U.S. PATENT DOCUMENTS

| | | | |
|---|---|---|---|
| 5,423,086 | 6/1995 | Cannon et al. | 455/186.1 |
| 5,537,558 | 7/1996 | Fletcher et al. | 710/129 |
| 5,878,282 | 3/1999 | Mital | 235/492 |
| 5,889,816 | 3/1999 | Agrawal et al. | 375/220 |

OTHER PUBLICATIONS

Schidt, Can Microsoft Make Pegasus Fly, Electronic Engineering Times, Oct. 1996.
Sabaa–El–gebaly–El–uibaly–Muzio–Shpak, Implementation of a Window–Based Scheduler in an ATM Switch, IEEE, Sep. 1995.
Gurelli–Nikias, Blind Identification of Co–Channel Systems, IEEE, May 1994.
Harper, Update on PCMCIA Standards Activities: CardBus and Beyond, PCMCIA, Jan. 1995.

*Primary Examiner*—Tariq R. Hafiz
*Assistant Examiner*—Antony Nguyen-Ba
*Attorney, Agent, or Firm*—McAulay Nissen Goldberg Kiel & Hand, LLP

[57] ABSTRACT

A personal information device is provided in the form of a PCMCIA card and includes a PCMCIA I/O port that is adapted to be coupled to a PCMCIA port of a computer, a first memory that is directly accessible by the computer via the PCMCIA I/O port, second and third memories that are not directly accessible to the computer, and a controller. When the personal information device is inserted into the computer's PCMCIA port, the first memory directly receives and stores therein reprogramming data supplied by the computer. Immediately after the data is downloaded, or alternatively, upon disconnection of the personal information device from the computer, the personal information device's controller transfers to the second memory reprogramming code included in the reprogramming data stored in the first memory, executes the reprogramming code stored in the second memory, and then programs the third memory by utilizing the application code included in the reprogramming data stored in the first memory in accordance with the reprogramming code being executed. The downloaded application code may include organizer application code for the end user, diagnostic code or other types of code. In addition to being able to interface with a computer via the computer's PCMCIA port, the personal information device may communicate with a computer by using a docking station that includes therein a controller and that is capable of changing the baud rate of data serially supplied thereto so as to allow a computer and a personal information device communicating at different baud rates to serially communicate with one another.

31 Claims, 5 Drawing Sheets

CALENDAR

CARDFILES

TO-DO LIST

MEMOS

CLOCK WITH ALARM

TOOL KIT

PERSONAL INFORMATION DEVICE AND METHOD FOR DOWNLOADING REPROGRAMMING DATA FROM A COMPUTER TO THE PERSONAL INFORMATION DEVICE VIA THE PCMCIA PORT OR THROUGH A DOCKING STATION WITH BAUD RATE CONVERSION MEANS

BACKGROUND OF THE INVENTION

The present invention relates to a personal information device, e.g., an electronic organizer, and method for downloading reprogramming data from a computer to the personal information device and, more particularly, to a micro-sized device in the form of a PCMCIA card that receives from a computer reprogramming data that is utilized to reprogram the flash memory of the personal information device. The invention also relates to a personal information device in combination with a docking station for coupling the personal information device to a computer's serial port and for converting the baud rate of signals supplied thereto so as to allow a personal information device and a computer communicating at different baud rates to communicate with one another.

Recently, there has been a trend to develop and utilize compact and pocket-size electronic devices, such as compact computers (notebook computers), compact electronic personal organizers, compact electronic dictionaries, compact electronic encyclopedias, and so on. As such devices become smaller in size, various problems result, including a reduction in the ease of their operation due to, for example, reduced-sized keys, reduced-sized displays and/or reduced number of keys thereon.

Recent developments have attempted to overcome this problem as well as other problems that are inherent in compact and pocket-sized electronic devices. For example, many compact electronic personal organizers are now equipped to communicate with a personal computer, wherein a user enters various data, e.g., telephone numbers, appointments, etc., into the computer which then transmits or downloads that entered data to the compact electronic personal organizer for storage therein. This technique provides two advantages over previous devices. Data is more easily entered with a full sized keyboard than with a reduced-size keypad. Data is entered only once to utilize organizer programs running on both the personal computer and the compact electronic personal organizer.

While the above-mentioned and other developments have produced more user friendly, easier to use and more sophisticated compact organizers, there still is a need for a personal information device, e.g., an electronic personal organizer, that is yet smaller in size than existing devices and easier to use, and which is designed to allow for easier development of software-driven features therein.

OBJECTS OF THE INVENTION

Therefore, it is an object of the present invention to provide a micro-sized personal information device which overcomes the short comings of existing devices.

Another object of the present invention is to provide a personal information device that is operable to easily and safely receive data downloaded from a computer attached thereto.

A further object of the present invention is to provide a personal information device that is capable of being coupled to a computer via the computer's PCMCIA port.

An additional object of this invention is to provide a personal information device that is easily reprogrammed to provide additional or different features, e.g., organizer features, to a user.

Still another object of the present invention is to provide an improved method of downloading reprogramming data from a computer to the personal information device.

Still an additional object of this invention is to provide a docking station that allows a personal information device and a computer communicating at different baud rates to communicate with one another.

Various other objects, advantages and features of the present invention will become readily apparent to those of ordinary skill in the art, and the novel features will be particularly pointed out in the appended claims.

SUMMARY OF THE INVENTION

In accordance with the present invention, a personal information device includes a housing in the form of a PCMCIA card, a PCMCIA I/O port at one end of the housing and that is adapted to be coupled to a PCMCIA port of a computer, a first memory coupled to the PCMCIA I/O port and that is directly accessible by the computer via the PCMCIA I/O port when the PCMCIA I/O port of the personal information device is coupled to the computer and a second memory that is not directly accessible to the computer, and a controller. When the computer is coupled to the PCMCIA I/O port of the personal information device, the first memory is adapted to receive and store therein reprogramming data, which includes application code and reprogramming code, that is supplied from the computer. Thereafter, the controller transfers to the second memory the reprogramming code stored in the first memory and executes the reprogramming code stored in the second memory. In addition, a third memory with the device may be programmed utilizing the application code in accordance with the executed reprogramming code.

As an aspect of the present invention, the third memory is a flash memory and the execution of the reprogramming code provides for the erasing of the flash memory followed by the programming of the erased flash memory with the application code stored in the first memory.

As another aspect of the present invention, the controller executes the application code programmed into the third memory after the third memory is programmed.

As a further aspect of the present invention, the controller is operable to detect when the personal information device is disconnected from the computer, and only thereafter the controller transfers to the second memory the reprogramming code stored in the first memory.

As an additional aspect, the controller is operable to diagnose the application code stored in the first memory by utilizing the reprogramming code, and then programs the third memory only upon a successful diagnostic of the application code.

Still yet a further aspect is to include an input device within the housing that is accessible by the user and a flat panel display for displaying information to the user.

In accordance with another embodiment of the present invention, a method for downloading reprogramming data from a computer to a personal information device in the form of a PCMCIA card is provided by directly accessing a first memory of the personal information device by the computer via a PCMCIA I/O port of the personal information device when the PCMCIA I/O port of the personal information device is coupled to a PCMCIA port of the computer, storing reprogramming data supplied from the computer in the first memory, the reprogramming data including application code and reprogramming code, transferring to a second memory of the personal information device the reprogramming code stored in the first memory, executing the reprogramming code stored in the second memory, and programming a third memory of the personal information device utilizing the application code in accordance with the executed reprogramming code.

In accordance with a further embodiment of the present invention, a docking station and corresponding method are provided for coupling and providing for data communication between a personal information device communicating at a first baud rate and a computer communicating at a second baud rate different from the first baud rate. The docking station includes a PCMCIA port adapted to be coupled to a PCMCIA I/O port of the personal information device, a serial connector adapted to be coupled to an I/O port of the computer, and a controller coupled to the PCMCIA port and the serial connector and operable to supply and receive data to and from the personal information device and the computer via the PCMCIA port and the serial connector. When serial data is to be supplied from the computer to the personal information device, the controller receives a plurality of framed bytes supplied by the computer wherein each bit of each framed byte is received at a respective instruction cycle of the controller, buffers selected ones of the bits of each respective framed byte, adds a bit of predetermined value to each framed byte, and serially supplies to the personal information device via the PCMCIA port each of the bits of a respective framed byte along with the added bit of the respective framed byte, each of the supplied bits of the respective framed byte being supplied at a respective instruction cycle of the controller.

As an aspect of this embodiment of the present invention, the respective instruction cycles at which the bits of a framed byte are received from the computer are different from the respective instruction cycles at which the bits of a framed byte are supplied to the personal information device.

As another aspect of this embodiment, when serial data is to be supplied from the personal information device to the computer, the controller serially receives a plurality of framed bytes supplied by the personal information device wherein each bit of a respective framed byte is received at a respective instruction, buffers selected ones of the bits of each respective framed byte, removes one of the bits from each of the framed bytes, and serially supplies to the computer each of the framed bytes having a bit removed therefrom, each of the bits of a respective supplied framed byte being supplied at a respective instruction cycle of the controller.

In accordance with an additional embodiment of the present invention, a personal information device system includes a personal information device in the form of a PCMCIA card and a docking station having a PCMCIA connector adapted to be coupled to the PCMCIA port of the personal information device. The docking station further includes a serial connector adapted to be coupled to an I/O port of a computer and a docking station controller that is coupled to the docking station's PCMCIA connector and serial connector, and that is operable to receive a serial transmission at a first baud rate supplied by the computer and to supply a serial transmission at a second baud rate to the personal information device. The personal information device further includes a memory and a controller that receives the serial transmission supplied from the docking station and stores the data represented in the serial transmission in the memory.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF CERTAIN PREFERRED EMBODIMENTS

The personal information device of the present invention is a micro-sized device that has the form of a PCMCIA card and that includes therein an LCD display screen and navigation buttons. As will be discussed, the personal information device (PID) provides various organizer or other types of features to a user and may be inserted within a PCMCIA port (also identified as a PC-card slot) of a personal computer for downloading of various information from the computer to the personal information device. Also, and as will be discussed, the personal information device may communicate with a personal computer via a docking station. The personal information device of the present invention, as described herein, is an electronic personal organizer having various organizer features and functions and, thus, is also identified herein as an organizer. However, the personal information device of the present invention may embody functions and features that are not considered to be so-called organizer functions and, thus, the present invention is not to be limited to electronic organizers.

Figure 1:
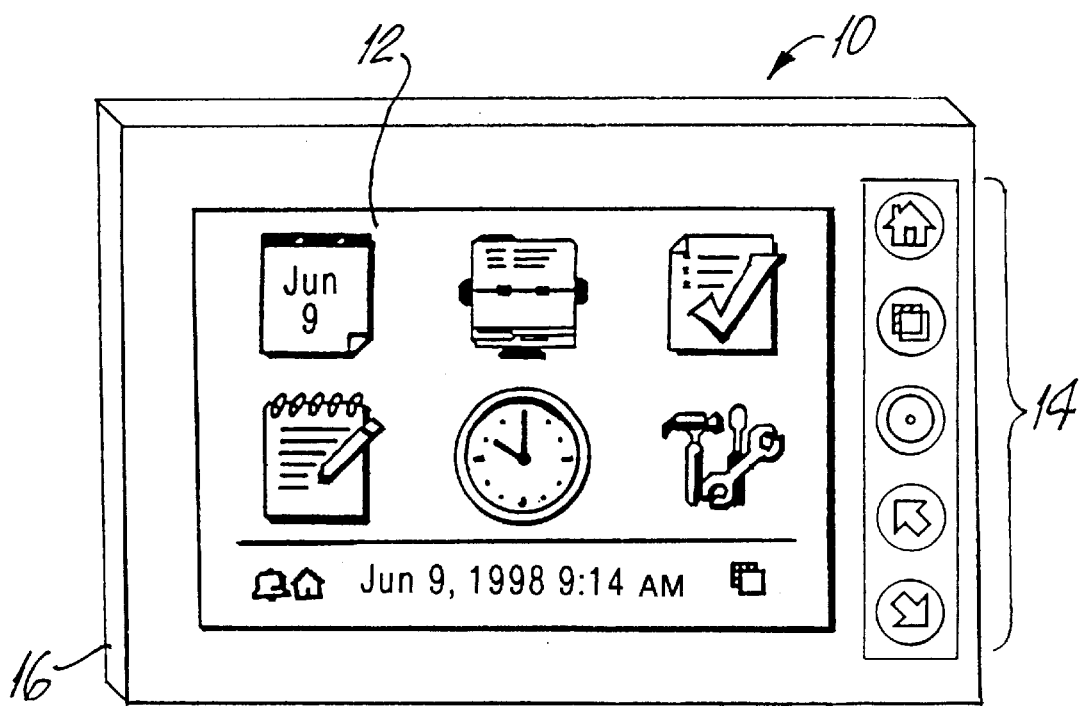
FIG. 1 is a schematic illustration of personal information device 10 of the present invention.

Referring now to the drawings, FIG. 1 is an exemplary illustration of the personal information device 10 of the present invention. As shown, personal information device 10 has a PCMCIA (Personal Computer Memory Card International Association) compatible form factor and includes a flat panel display 12, for example, an LCD display screen, various buttons 14 and a PCMCIA port 16. Display 12 and buttons 14 are within the form factor of the PCMCIA card and, thus, personal information device 10 having such display and buttons may be inserted into the PCMCIA port of a personal computer. During "standard" operation of the personal information device, that is, when the device is not coupled to a computer, various organizer features are provided to a user. For example, and as shown on display 12 of the exemplary illustration of FIG. 1, the various organizer features may be provided in the form of a menu having selectable entries therein. In the exemplary embodiment, the various organizer features of personal information device 10 include a schedule/appointment calender, a telephone directory, a "to do" list, a memo holder, various time clocks and user customization, with each organizer function having a respective icon on the displayed menu. Using the appropriate input buttons 14, the user selects any one of the displayed icons to implement the corresponding organizer feature, and upon selection of an organizer feature, a sub-menu or other display is provided.

Figures 2A, 2B, 2C:
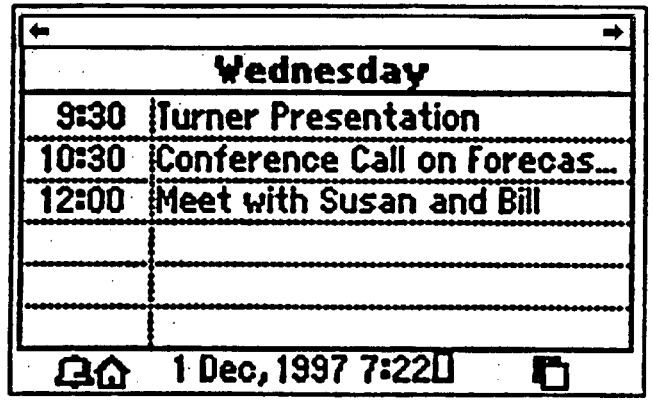
FIGS. 2A–2F are exemplary displays of the various organizer features of personal information device 10.
Figure 2D:
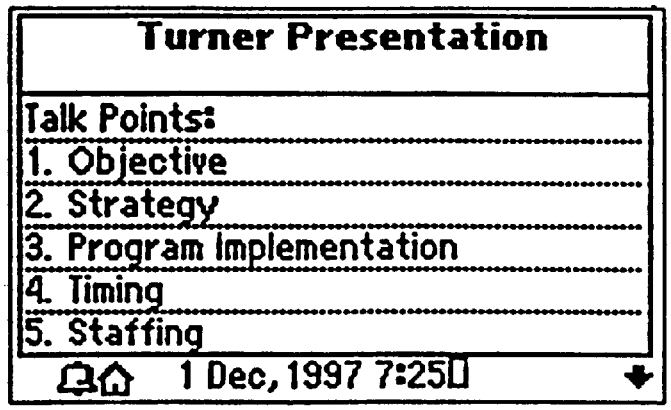
Figure 2E:
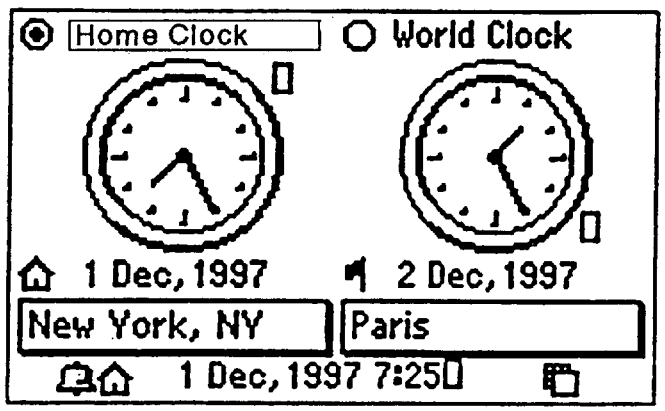
Figure 2F:
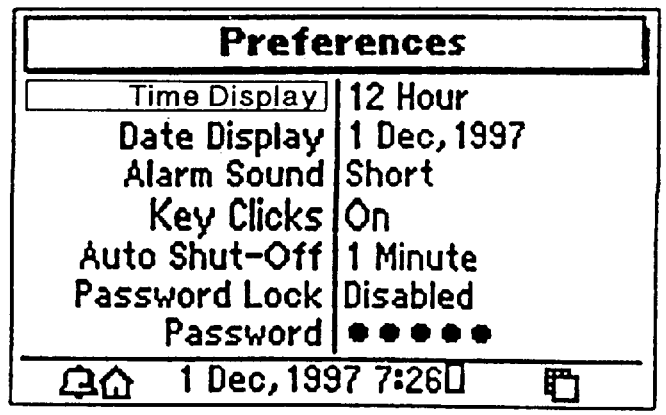

FIGS. 2*a*–2*f* are exemplary displays of the six exemplary organizer features that may be selected. FIG. 2*a* is displayed upon selection of the calendar icon in the main menu of FIG. 1, FIG. 2*b* is displayed upon selection of the card file (or Rolodexg) icon, FIG. 2*c* is displayed upon selection of the "to do" list icon, FIG. 2*d* is displayed upon selection of the memo icon, and FIG. 2*e* is displayed upon selection of the clock icon. FIG. 2*f* represents a user customization menu and is displayed upon selection of the toolkit icon.

Generally, the user depresses the appropriate buttons 14, which includes, for example, a main menu button, up and down cursor movement buttons, a select entry button, etc., to manipulate through the various menus and displays of personal information device 10. It is appreciated that the illustrated displays and buttons are provided for purposes of a background understanding of the organizer features of the present invention and are not intended to limit the present invention solely thereto. Since the basic operation of the personal information device having various menus and displays for providing various organizer functions to a user is well known to those of ordinary skill in the art, further description thereof is not provided herein except where necessary for an understanding of the present invention.

The "Reprogramming" Feature

In accordance with the present invention, personal information device 10 includes the capability of receiving "reprogramming" data from a personal computer coupled thereto and reprogramming itself utilizing the downloaded data so as to provide new applications to the user and/or to update the software currently stored in the personal information device. The downloaded applications may include organizer and/or other applications and features for the end-user, as well as diagnostic code that is generally utilized during the production of the application and reprogramming code itself. As will be discussed, the downloading of data and reprogramming of the personal information device of the present invention is herein identified collectively as the "reprogramming" feature of the personal information device.

Figure 3:
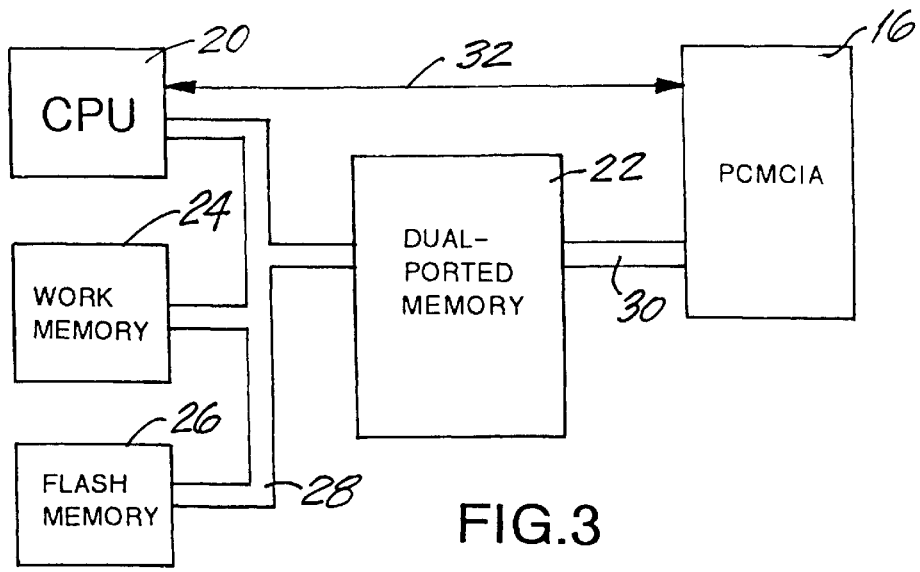
FIG. 3 is a block diagram of personal information device 10 of the present invention.

Referring to the block diagram of personal information device 10 shown in FIG. 3, personal information device 10 includes a processor (CPU) 20, a dual-ported memory 22, a work memory 24, a flash memory 26 and PCMCIA port 16. Although not shown in FIG. 3, personal information device 10 further includes display 12, buttons 14, previously discussed, and a battery for supplying power to the various components. Dual-ported memory 22 is accessible to processor 20 and also to a computer via a bus 30 and PCMCIA port 16 when coupled to personal information device 10. Processor 20 is coupled to work memory 24, flash memory 26 and dual-ported memory 22 via a bus 28. As shown in FIG. 3, work memory 24 and flash memory 26 are not externally accessible. Also, various control signals are provided between processor 20 and the attached computer via lines 32 and PCMCIA port 16.

Personal information device 10 is operable to communicate with a host computer in one of two ways. When the host computer includes a PCMCIA port or slot, and since personal information device 10 is a PCMCIA card, the personal information device may simply be inserted into the computer's PCMCIA port. Insertion of personal information device 10 into the computer's PCMCIA port is identified herein as the direct connection method. If, however, the host computer does not include a PCMCIA port, the docking station of the present invention is utilized to couple personal information device 10 to the computer. As will be discussed, the docking station includes a PCMCIA slot into which personal information device 10 is inserted and a serial connector for connection to the serial port of the computer.

The reprogramming feature of the present invention is carried out in three stages, a downloading stage, an installation stage and a reprogramming stage, and is discussed below with the assumption that the host computer includes a PCMCIA slot into which personal information device 10 is inserted. The first or downloading stage involves the downloading of code from a computer to the personal information device. When personal information device 10 is inserted into the PCMCIA port of a host computer and when appropriate application code in the computer is executed, application and reprogramming code is downloaded to dual-ported memory 22 under the control of the host computer. The application code, the reprogramming code and a special data string, which is used to facilitate the installation stage, are stored in dual-ported memory 22. The application code, reprogramming code and special data string are collectively identified as the reprogramming data. The second or installation stage involves the transferring to work memory 24 of the reprogramming code contained in the reprogramming data stored in dual-ported memory 22. The programming code is transferred so that processor 20 can safely execute it. The final or reprogramming stage involves the execution of the programming code stored in work memory 20 which, in turn, programs flash memory 26, as discussed below. Upon completion of the reprogramming stage, the reprogramming code passes execution to the newly installed application code in the flash memory.

The Downloading Stage

During the downloading stage, the reprogramming data is downloaded from the attached host computer and stored in dual-ported memory 22. In the direct connection method, that is, when personal information device 10 is inserted into the PCMCIA port of the host computer, the host computer addresses dual-ported memory 22 as it would during normal communications with personal information device 10 and stores the reprogramming data in dual-ported memory 22.

When a docking station is used, serial communication device driver software within processor 20 utilizes several pins of PCMCIA connector 16 as serial communications lines, and using an established protocol, the driver stores the reprogramming data (serially transmitted, discussed below) in dual-ported memory 22.

Figure 4:
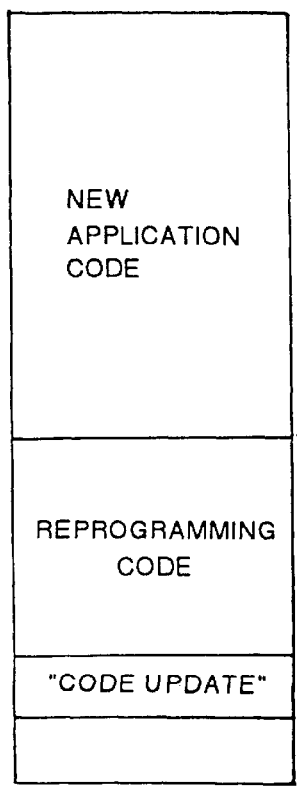
FIG. 4 is a data structure of dual-ported memory 22 in accordance with the present invention.

In accordance with the present invention, the reprogramming data is stored at the address locations in dual-ported memory 22 in the manner shown in FIG. 4. As shown, a "Code Update" string of the reprogramming data is stored at a pre-defined address location, the reprogramming code is stored at another pre-defined address location following (or not pre-defined location but immediately following) the code update string, and the new application code (also called flash application code) to be installed into flash memory 26 is stored at a further pre-defined address location following (or not pre-defined location but immediately following) the reprogramming code. As previously mentioned, the code update string (special data string) identifies that the data stored in dual-ported memory 22 is for reprogramming of flash memory 26 and is utilized during the installation stage.

Figure 5:
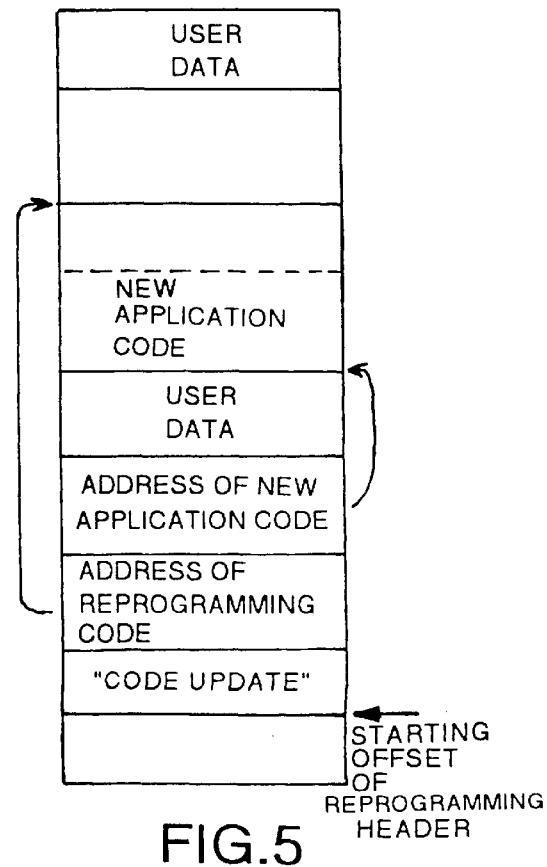
FIG. 5 is a data structure of dual-ported memory 22 in accordance with another embodiment of the present invention.

While a particular data structure of dual-ported memory 22 is shown in FIG. 4, other structures are possible. For example, FIG. 5 discloses a structure wherein a reprogramming header stored at a pre-defined address location identifies the address locations at which the reprogramming data and the new application code are stored. In this structure, greater flexibility is achieved by utilizing (e.g., during downloading) only that memory of dual-ported memory 22 that is necessary. For example, user data that is stored in dual-ported memory 22 (prior to the initiation of the reprogramming feature) may be retained (i.e., not overwritten during the downloading stage) for future use by the application software.

Still yet other data structures are possible. For example, the reprogramming and application code may be stored in blocks throughout the memory instead of in contiguous memory. In this instance, dual-ported memory 22 is divided into blocks of pre-defined size with each block beginning with a respective block header. Also, the fragmented code in dual-ported memory 22 can be referenced by an expanded reprogramming header or by a scan of each block header for a special string.

The Installation Stage

When the reprogramming data is stored in dual-ported memory 22, the installation stage begins wherein the reprogramming code is transferred by processor 20 to work memory 24. As previously mentioned, work memory 24 is not accessible via PCMCIA connector 16. Thus, work memory 24 is protected from subsequent downloading of data (write operations) by the host computer thereby providing the desired result that the reprogramming code stored in work memory 24 cannot be overwritten by the host computer during its execution.

In accordance with the preferred embodiment of the present invention, the installation stage does not begin until personal information device 10 card is removed from the computer's PCMCIA slot. The disconnection of personal information device from the host computer causes an interrupt to processor 20 (via lines 32) which, in turn, initiates a routine within processor 20 that controls processor 20 to determine if reprogramming data has been newly downloaded into dual-ported memory 22. If the "Code Update" string is stored at the predefined address within dual-ported memory 22, processor 20 transfers (installs) the reprogramming data stored in dual-ported memory 22 to work memory 24, at which time, the installation stage is complete.

In an alternative embodiment of the present invention, processor 20 periodically polls dual-ported memory 22 to determine if reprogramming data is newly downloaded, for example, by polling for the "Code Update" string. Upon determination that new reprogramming data has been downloaded, processor 20 transfers the new reprogramming data to work memory 24. In this embodiment, installation of reprogramming data into work memory 24 and the subsequent programming of the flash memory (in the next stage) can occur while personal information device 10 is still coupled to the host computer.

The Reprogramming Stage

Upon installation of the reprogramming data into work memory 24, processor 20 passes execution to the reprogramming code stored in work memory 24 to begin the reprogramming stage. The reprogramming code, also called the reprogramming application, carries out a multi-step process of first diagnosing the new application code stored in dual-ported memory 22, then erasing flash memory 26, and finally programming flash memory 26 with the new application code stored in dual-ported memory 22.

Initially, the reprogramming application ascertains the integrity of the newly downloaded application code. This may be achieved in any number of ways including, for example, performing a checksum of the application code. Other diagnostic techniques are well known in the art and therefore are not discussed herein. If the reprogramming application ascertains errors in the application code, it may attempt to correct those errors if the application code also includes appropriate error correction code. If the application code is faulted and not correctable, then the reprogramming feature of personal information device 10 terminates thus preserving the older application code stored in flash memory 26. In an alternative embodiment, the diagnostic step is skipped.

In addition to diagnosing the newly downloaded application code, the status of the power source (i.e., battery) is verified to determine if the power source can provide enough power for the personal information device to erase flash memory 26 and subsequently reprogram flash memory 26 (discussed below). If the power source measures below a predetermined threshold, then it is likely that the reprogramming feature cannot be performed to completion and, thus, the reprogramming feature is terminated at this point (i.e., before the flash memory is erased) thereby preserving the older application code stored in flash memory 26.

The reprogramming application carries out an erasing operation of flash memory 26. However, since the programming algorithm and program/erase block size that are utilized to erase a flash memory is dependent on the type of flash device that is included within personal information device 10, the reprogramming code controls processor 20 to query flash memory 26 for a device ID stored therein. Upon ascertaining the device ID of flash memory 26, the reprogramming application proceeds with the erasing of the flash memory. Since the procedures for erasing various types of flash memories are well known in the art, further description thereof is not provided herein. Alternatively, an auto-erase type flash memory may be utilized thus obviating the need for the reprogramming application to carry out a separate erase function.

When flash memory 26 is fully erased (alternatively, partially erased), controller 20 programs flash memory 26 by transferring thereto the application code stored in dual-ported memory 22. Once flash memory 26 is programmed with the new application code, the reprogramming feature of personal information device 10 is complete, at which time, processor 20 passes execution to the newly installed flash code. In the presently discussed embodiment, the newly installed flash code generally will represent user organizer features including, for example, telephone/address book, memos, and so on. Of course, the flash code may be diagnostic code that is useful for the development of organizer functions and/or other types of functions.

The above-described reprogramming feature is carried out, as previously discussed, by inserting personal information device 10 within the PCMCIA port of a personal computer, downloading reprogramming data from the computer to dual-ported memory 22 of personal information device 10, removing personal information device 10 from the computer's PCMCIA port, transferring the reprogramming code within the downloaded data to work memory 24, executing the reprogramming code within work memory 24 which, in turn, re-programs flash memory 26 with the downloaded application code stored in the dual-ported memory, and upon completion of reprogramming flash memory 26, passing execution to the application code stored in flash memory 26.

In accordance with another embodiment of the present invention, the above-listed "steps", except the last step of passing execution to the application code, is considered to be a single "pass" wherein a multiple number of "passes" are required to fully reprogram the flash memory. In this embodiment, flash memory 26 may be rather large in size relative to the size of dual-ported memory 22, wherein each "pass" causes a different portion of flash memory 26 to be programmed.

When personal information device 10 is inserted into the PCMCIA port of host personal computer, a partial amount of reprogramming data (also identified as a first set of reprogramming data) is downloaded from the computer to dual-ported memory 22. The downloaded first set of reprogramming data includes "first" reprogramming code and "first" application code. Personal information device 10 then is removed from the PCMCIA port of the host computer, at which time, the "first" reprogramming code is transferred to work memory 24. The "first" reprogramming code stored in work memory 24 is executed which, in turn, causes flash memory 26 to be partially reprogrammed (and erased, if necessary) with the "first" application code stored in dual-ported memory 22. The completion of this "first" reprogramming of flash memory 26 is said to complete the first pass.

After the first pass, a second pass is initiated when the user reinserts personal information device 10 into the PCMCIA port of the same host computer, at which point, a second set of reprogramming data (including a second reprogramming code and a second application code) is downloaded from the computer to dual-ported memory 22. Personal information device 10 then is again removed from the PCMCIA port of the host computer, at which time, the second reprogramming code is transferred to work memory 24 and executed which causes flash memory 26 to be again partially reprogrammed (and erased, if necessary) with the second application code stored in dual-ported memory 22. If necessary, third, fourth and even more passes may be carried out if necessary. Upon completion of all the necessary passes, execution is passed to the application code stored in flash memory 26.

In the above-discussed "multiple pass" embodiment of the present invention, flash memory 26 is large in size relative to the other memory components within personal information device 10. By providing for multiple reprogramming passes, it is possible to reprogram a large memory (i.e., the flash memory) utilizing a smaller dual-ported memory as well as a smaller work memory.

The Docking Station

Figure 6:
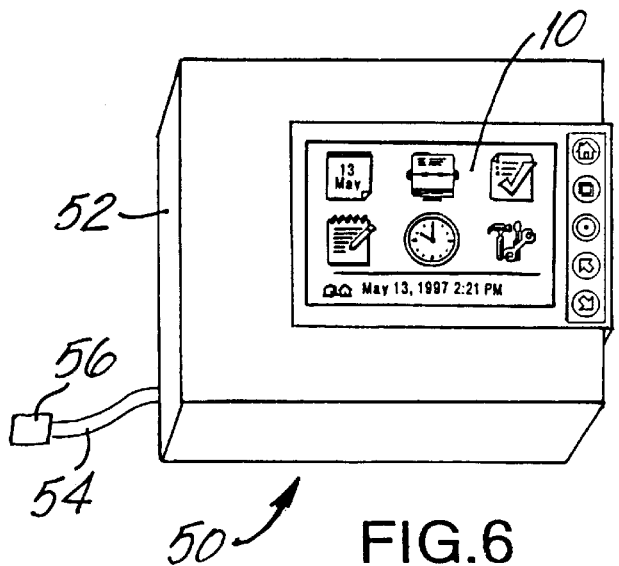
FIG. 6 is a schematic illustration of docking station 50 having personal information device 10 coupled thereto in accordance with the present invention.

In accordance with the present invention, personal information device 10 may connect to a host computer via a docking station. FIG. 6 is a schematic illustration of a docking station 50 having personal information device 10 coupled thereto. Generally, docking station 50 is utilized when the host computer does not include a PCMCIA port. As shown in FIG. 6, docking station 50 includes a main body 52, a cable 54 and a serial connector 56 attached to the end of cable 54. Body 52 of the docking station is shaped in such a manner so that personal information device 10 may be slidable therein. Docking station 50 also includes a PCMCIA connector 62 (hidden in FIG. 6) to which PCMCIA connector 16 of personal information device 10 may be coupled.

Figure 7:
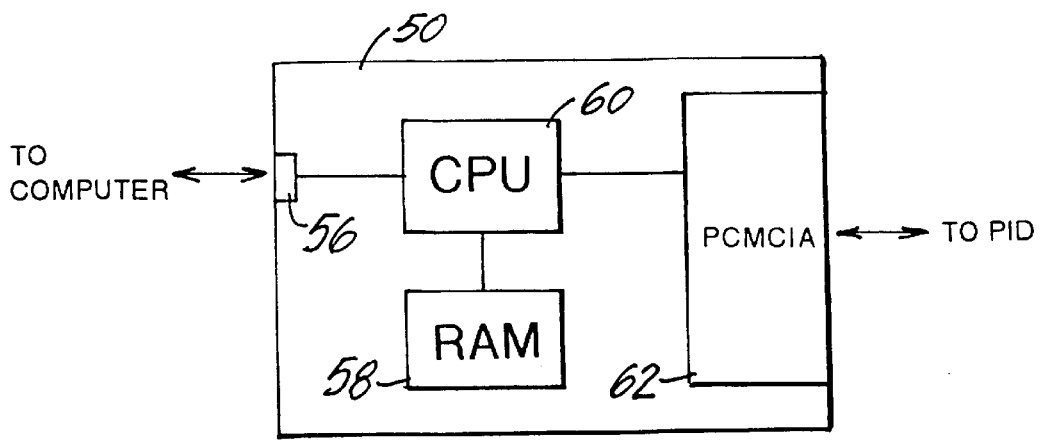
FIG. 7 is a block diagram of docking station 50 of the present invention.

During its use, docking station 50 receives personal information device 10 in the manner shown in FIG. 6 and is coupled to the host computer's serial port via serial connector 56. In another embodiment, docking station includes an appropriate connector, in place of serial connector 56, that is adapted to couple to the host computer's parallel port or to another I/O port of the computer. Referring to the block diagram of FIG. 7, docking station 50 includes serial connector 56, PCMCIA connector 62, a buffer memory (RAM) 58 and a processor (CPU) 60. Alternatively, the buffer memory may be contained within processor 60 itself.

Processor 60 (alternatively, memory 58) includes stored therein docking station executable code for carrying out the baud rate conversion of the present invention. The executable code, also identified herein as the baud rate conversion program or code, provides for a fast and effective transfer rate between personal information device 10 and the host computer. In the preferred embodiment, the baud rate conversation program carries out the fastest serial transfer rate that is possible between the personal information device and the host computer. Generally, the personal information device of the present invention is capable of faster serial communication than typical personal computers. For example, the personal information device may have a baud rate of 67.1875K baud while typical personal computers have a fastest baud rate of 57.6K baud. However, these numbers generally will go up with further developments and cheaper equipment. Even so, it is desirable for the personal information device 10 to be able to interface with any type of personal computer and, thus, the baud rate conversion program of the present invention allows for such interfacing. Without baud rate conversion, the host computer and personal information device would have to communicate at the highest common baud rate of, for example, 9600 baud.

The docking station in combination with the personal information device and the host computer may operate in a first mode in which baud rate conversion is carried out in docking station 50, or in a second mode in which baud rate conversion is not carried out and the host computer and the personal information device are "instructed" to communicate at their highest common baud rate. The application software being executed by the host computer may determine in which of these modes the devices are to operate. In such case, to select the "slow" speed mode (i.e., no baud rate conversion), the host computer transmits a zero byte at 19.2K baud (or less), and to select the "fast" speed mode, the host computer transmits a "FF" at its fast speed of, for example, 57.6K baud. In the slow speed mode, the serially transmitted data simply passes through docking station 50 (i.e., processor 60 simply provides the received serial data as an output). In the fast speed mode, docking station 50 carries out baud rate conversion in the manner discussed below.

Figure 8:
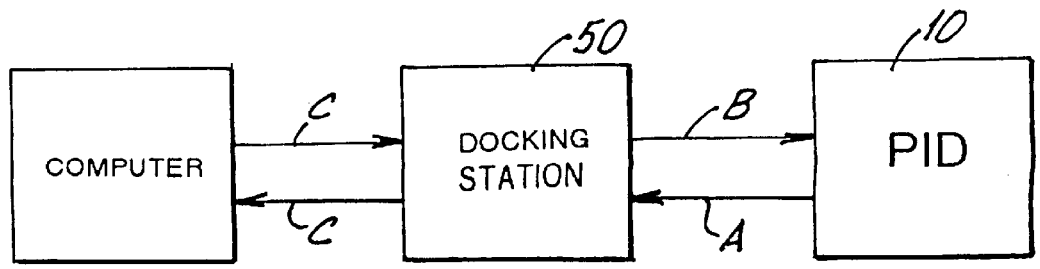
FIG. 8 is a schematic illustration of the coupling of personal information device 10 via docking station 50 to a host computer.

When docking station 50 carries out baud rate conversion in accordance with the present invention, communication between docking station 50 and personal information device 10 of the present invention is always carried out at the personal information device's fastest communication speed of, for example, 67.1875K baud (hereinafter 67.2K), and communication between docking station 50 and the host computer is carried out at the computer's fastest communication speed (or a suitably high speed to facilitate the present invention) of, for example, 57.6K baud. Thus, and referring to FIG. 8, when data is transmitted from personal information device 10 to the host computer, data is first sent from personal information device 10 to docking station 50 at the baud rate "A" of 67.2K baud, and then transmitted from docking station 50 to the host computer at the baud rate "C" of 57.6K baud. For transmissions originating from the computer, data is transmitted from the computer to docking station 50 at the baud rate "C" of 57.6K baud and then transmitted from docking station 50 to personal information device 10 at the baud rate "B" of 67.2K baud. While the "A" and "B" baud rates are the same, communication to docking station 50 from personal information device 10 is distinguished from communication to personal information device 10 from docking station 50 because the bit structure of the transmitted data is different therebetween, as discussed below.

In accordance with the present invention, processor 60 of docking station 50 (in accordance with the baud rate conversion program) "counts" instruction cycle times of the individual instructions being executed within the baud rate conversion program and, at the proper times, inputs and\or outputs bits to\from personal information device 10 and the host computer. That is, each bit of each "framed byte" transmitted\received by docking station 50 follows a previously transmitted\received bit by a predetermined amount of time since both the transmitting and receiving baud rates are known, and since the amount of time for an instruction cycle within processor 60 is known, the time at which a bit is transmitted or received is definable in terms of instruction cycles. In the given example, to maintain the 57.6K baud rate, a bit must be transmitted or received every 17.36 instruction cycles (for the particular oscillator utilized by processor 60), and to maintain the 67.1875K baud rate, a bit must be transmitted or received every 14.9 instructions cycles. As discussed herein, a "framed byte" generally includes data bits (e.g., 8 data bits) and other bits to facilitate serial communication (e.g., start, parity and stop bits).

In accordance with the present invention, Table 1 shown below provides a docking station input/output (receipt/ transmission) schedule of each bit of a respective framed byte that originates from personal information device 10 and that is supplied to the host computer. Moreover, to facilitate proper baud rate conversion of data supplied to docking station 50 at the 67.1875K baud rate from personal information device 10 to the slower 57.6K baud rate of data transmitted from docking station 50 to the host computer, personal information device 10 transmits for each framed byte an additional two bits (an additional parity bit and an additional stop bit) that are subsequently not utilized by docking station 50 and thus not transmitted to the host computer. Additional bits are transmitted from personal information device 10 to docking station 50 so as to effectively slow down the overall byte transfer rate. In the present embodiment, 12 bits are transmitted at the 67.1875K baud rate by personal information device 10 and include: a start bit, 8 data bits, a parity bit and 2 stop bits. The Docking station, in turn, transmits to the host computer 10 bits: a start bit, 8 data bits and a stop bit.

TABLE I

Personal Information Device to Computer - Input/Output Schedule

| Instruction Cycle | Receive from PID 10 | Transmit to Computer |
|---|---|---|
| 7 | receive start bit | |
| 9 | | send start bit |
| 22 | receive data bit 0 (15) | |
| 26 | | send data bit 0 (17) |
| 37 | receive data bit 1 (15) | |
| 44 | | send data bit 1 (18) |
| 52 | receive data bit 2 (15) | |
| 61 | | send data bit 2 (17) |
| 67 | receive data bit 3 (15) | |
| 78 | | send data bit 3 (17) |
| 82 | receive data bit 4 (15) | |
| 96 | | send data bit 4 (18) |

TABLE I-continued

Personal Information Device to Computer - Input/Output Schedule

| Instruction Cycle | Receive from PID 10 | Transmit to Computer |
|---|---|---|
| 97 | receive data bit 5 (15) | |
| 112 | | send data bit 5 (16) |
| 113 | receive data bit 6 (16) | |
| 127 | receive data bit 7 (14) | |
| 131 | | send data bit 6 (19) |
| dnc | receive parity bit (dnc) | |
| 148 | | send data bit 7 (17) |
| dnc | receive $1^{st}$ stop bit (dnc) | |
| 165 | | send stop bit (17) |
| dnc | receive $2^{nd}$ stop bit (dnc) | | dnc: do not care

Referring to Table 1, a start bit is received from personal information device 10 at instruction cycle 7 which, in turn, causes a start bit to be transmitted to the computer at instruction cycle 9. Processor 60 of the docking station then polls its serial input port at instruction cycle 22 to receive data bit 0, and docking station 50 transmits data bit 0 to the computer at instruction cycle 26. The number of cycles that have passed from the previous input/output is shown in parenthesis in Table 1. As shown, there are between 14 to 16 cycles between the occurrence of two successive inputs from personal information device 10, which reflects the 14.9 instruction cycles per bit at the 67.2K baud rate, and there are between 16 to 19 cycles between the occurrence of two successive outputs to the host computer, which reflects the 17.36 instruction cycles per bit at the 57.6K baud rate. Furthermore, Table 1 does not identify the instruction cycles at which the parity and 2 stop bits are received primarily since the times of reception of these bits are unimportant to the times at which bits are output to the computer. Finally, received data bits are temporally buffered within docking station 50 when necessary so that they may be supplied out at the appropriate instruction cycle.

When data is transmitted from the host computer via docking station 50 to personal information device 10, the baud rate of the transmitted data is increased from the computer's transmission baud rate of 57.6K baud to the personal information device's reception baud rate of 67.1875K baud. In accordance with the present invention, Table 2 shown below provides a docking station input/ output (receipt/transmission) schedule of each bit that originates from the host computer and that is supplied to personal information device 10. In addition, to facilitate a proper decrease in baud rate, docking station 50 adds an additional bit to each framed byte supplied by the host computer. In the present embodiment, the host computer supplies to the docking station 10 bits: a start bit, 8 data bits and a stop bit, which 10 bits have the same structure as the 10 bits supplied to the host computer during personal information device to computer communication, discussed above. The docking station transmits to the personal information device 11 bits: a start bit, 8 data bits, a parity (set) bit and a stop bit. The parity bit in the preferred embodiment is simply a set bit, but may be a reset bit or an actual parity bit.

TABLE II

Computer to Personal Information Device - Input/Output Schedule

| Instruction Cycle | Receive from Computer | Transmit to PID 10 |
|---|---|---|
| 4–11 | receive start bit | |

TABLE II-continued

Computer to Personal Information Device - Input/Output Schedule

| Instruction Cycle | Receive from Computer | Transmit to PID 10 |
|---|---|---|
| 26 | receive data bit 0 | |
| 32 | | send start bit |
| 43 | receive data bit 1 (17) | |
| 47 | | send data bit 0 (15) |
| 61 | | send data bit 1 (14) |
| 62 | receive data bit 2 (19) | |
| 77 | | send data bit 2 (16) |
| 78 | receive data bit 3 (16) | |
| 92 | | send data bit 3 (15) |
| 95 | receive data bit 4 (17) | |
| 106 | | send data bit 4 (14) |
| 113 | receive data bit 5 (18) | |
| 121 | | send data bit 5 (15) |
| 130 | receive data bit 6 (17) | |
| 136 | | send data bit 6 (15) |
| 148 | receive data bit 7 (18) | |
| 151 | | send data bit 7 (15) |
| 165 | receive stop (17) | |
| 167 | | send parity (set)(16) |

Referring to Table 2, a start bit is received from the host computer sometime between instruction cycle 4 and 11, and then data bit 0 is receive at instruction cycle 26. The data bit is buffered and a start bit is transmitted to personal information device 10 at instruction cycle 32. Data bits 1–7 and the stop bit are received by docking station 50 at the instruction cycles indicated in the table, and data bits 0–7 are transmitted from docking station 50 to personal information device 10 at the instruction cycles indicated. Finally, a parity (set) bit is supplied to personal information device 10 at instruction cycle 167, and thereafter a stop bit is transmitted to personal information device 10. In the preferred embodiment, the values of the parity and stop bits are the same and, thus, the output remains the same to supply the stop bit after the parity (set) bit.

The docking station of the present invention, as discussed above, uses instruction cycles to determine when bits are to be input or output to a connected device. In an alternative embodiment of the present invention, a timer is utilized wherein the baud rate conversion program provides for receiving or outputting a respective bit at a time that is a function of the timer value and the baud rate at which the data is input or output. If the timer is reset after receiving/outputting each bit, then the timer value itself identifies the passage of time after reception/transmission of the previously input/output bit. If the timer is not reset, then bits are received/output at predetermined timer values. One or more timers may be utilized. In one embodiment, a first timer is provided for received bits and a second timer is utilized for output bits.

As discussed above, the personal information device of the present invention, whether or not used in combination with the docking station of the present invention, includes therein the capability of re-programming its own flash memory with new/revised application code. The reprogramming feature of the present invention provides for safe reprogramming by utilizing a separate work memory that is not accessible to the host computer for reprogramming purposes and by providing a mechanism for verifying that newly downloaded application code is error free prior to the reprogramming of the flash memory. In addition, the PCMCIA card design of the personal information device is perfectly suited for mobile use but with advantageously powerful organizer capability. The personal information device's reprogramming feature further provides for easier development of application code. Finally, the docking station of the present invention allows the personal information device to interface with a host computer that does not include therein a PCMCIA port, and further provides the advantageous feature of allowing the host computer to communicate with the personal information device at its fastest baud rate.

While the present invention has been particularly shown and described in conjunction with preferred embodiments thereof, it will be readily appreciated by those of ordinary skill in the art that various changes may be made without departing from the spirit and scope of the invention. For example, although the present discussion is directed to a device to be used as a micro-sized personal organizer, the present invention is not limited solely thereto and may applied to devices that perform other functions. Various other devices include pagers, mobile telephones, electronic maps, safety devices, classroom training devices, etc., as well as other devices that may be incorporated within a PCMCIA card or other equivalent and which may be interfaced with a personal computer for downloading of application code and reprogramming code thereto.

As another example, although the present discussion is directed to a personal information device in the form of a PCMCIA card, other physical formats may be utilized such as floppy disks, compact disks, magnetic cards, smart cards, etc.

Still further, although specific baud rates of communication have been discussed herein, the docking station of the present invention may be utilized to provide for conversion of serially transmitted and received data at other baud rates.

Therefore, it is intended that the appended claims be interpreted as including the embodiments described herein, the alternatives mentioned above, and all equivalents thereto.

What is claimed is:

1. A personal information device, comprising:

a housing in the form of a PCMCIA card;

a PCMCIA I/O port at one end of the housing and adapted to be coupled to a PCMCIA port of a computer;

a first memory in said housing and coupled to said PCMCIA I/O port, said first memory being directly accessible by the computer via the PCMCIA I/O port when the PCMCIA I/O port of the personal information device is coupled to the computer, said first memory being adapted to receive and store therein reprogramming data having reprogramming code therein supplied from the computer;

a second memory in said housing said second memory not being directly accessible to the computer; and a controller coupled to said first and second memories, said controller being operable to transfer to said second memory the reprogramming code stored in said first memory, and execute the reprogramming code stored in said second memory said controller transferring to the second memory the reprogramming code stored in the first memory only after the personal information device is disconnected from the computer.

2. A personal information device, comprising:

a housing in the form of a PCMCIA card;

a PCMCIA I/O port at one end of the housing and adapted to be coupled to a PCMCIA port of a computer;

a first memory in said housing and coupled to said PCMCIA I/O port said first memory being directly accessible by the computer via the PCMCIA I/O port when the PCMCIA I/O port of the personal information device is coupled to the computer, said first memory being adapted to receive and store therein reprogramming data having reprogramming code therein supplied from the computer;

a second memory in said housing, said second memory not being directly accessible to the computer;

a third memory in said housing; and a controller coupled to said first and second memories, said controller being operable to transfer to said second memory the reprogramming code stored in said first memory, and execute the reprogramming code stored in said second memory;

wherein said reprogramming data supplied from the computer and stored in the first memory further includes application code therein; and said controller further operates to program the third memory utilizing the application code under the control of the executed reprogramming code.

3. The personal information device of claim 2, wherein the third memory is an auto-erase type flash memory and the execution of the reprogramming code provides for the programming of the flash memory with the application code stored in the first memory.

4. The personal information device of claim 2, wherein the third memory is a flash memory and the execution of the reprogramming code provides for the erasing of the flash memory followed by the programming of the erased flash memory with the application code stored in the first memory.

5. The personal information device of claim 4, wherein said flash memory includes therein a device ID identifying a type of said flash memory; and said controller is operable to query the flash memory in accordance with the executed reprogramming code to identify the type of said flash memory, and erase the flash memory in accordance with the identified type of said flash memory and the executed reprogramming code.

6. The personal information device of claim 4, further comprising a power source for supplying power to said first, second and third memories and said controller; and said controller is operable to ascertain a level of said power source prior to programming the third memory, and the flash memory is erased and then programmed only if the ascertained level of said power source is above a predetermined threshold.

7. The personal information device of claim 2, wherein said controller further is operable to execute the application code programmed into the third memory after the third memory is programmed in accordance with the executed reprogramming code.

8. The personal information device of claim 2, wherein said controller is further operable to diagnose the application code stored in the first memory in accordance with the executed reprogramming code, and program the third memory only upon a successful diagnostic of the application code.

9. The personal information device of claim 2, wherein said reprogramming data supplied from the computer and stored in the first memory includes code update data identifying that said reprogramming data includes reprogramming code; and said controller is operable to detect the code update data stored in the first memory and to transfer to said second memory the reprogramming code stored in said first memory only after the code update data is detected.

10. The personal information device of claim 2, further comprising an input device within the housing and accessible by a user for receiving user-supplied information and a flat panel display within or on said housing and visible to said user for displaying information thereto; and wherein said controller is operable to execute the application code programmed into the third memory and, when the application code is being executed, the controller is responsive to the user-supplied information received by said input device and is operable to control said flat panel display in accordance with the executed application code.

11. The personal information device of claim 10, wherein the controller executes the application code programmed into the third memory after the third memory is programmed.

12. The personal information device of claim 2, wherein said first memory receives and stores therein first reprogramming data supplied from the computer, the first reprogramming data including first application code and first reprogramming code; and said controller transfers to said second memory the first reprogramming code stored in said first memory, executes the first reprogramming code stored in said second memory, and partially programs the third memory utilizing the first application code in accordance with the executed first reprogramming code;

and after the third memory is partially programmed, said first memory receives and stores therein second reprogramming data supplied from the computer, the second reprogramming data including second application code and second reprogramming code; and said controller transfers to said second memory the second reprogramming code stored in said first memory, executes the second reprogramming code stored in said second memory, and further partially programs the third memory utilizing the second application code in accordance with the executed second reprogramming code.

13. The personal information device of claim 12, wherein said controller is operable to detect when the personal information device is disconnected from the computer, and said controller transfers to the second memory the first reprogramming code stored in the first memory only after the personal information device is disconnected from the computer; and said first memory receives and stores therein the second reprogramming data that is supplied from the computer after the computer is reconnected to the personal information device.

14. A method of downloading reprogramming data from a computer to a personal information device in the form of a PCMCIA card, comprising the steps of:

directly accessing a first memory of the personal information device by a computer via a PCMCIA I/O port of the personal information device when the PCMCIA I/O port of the personal information device is coupled to a PCMCIA port of the computer;

storing reprogramming data supplied form the computer in the first memory, the reprogramming data including reprogramming code;

transferring to a second memory of the personal information device the reprogramming code stored in the first memory only after the personal information device is disconnected from the computer; and executing the reprogramming code stored in the second memory.

15. A method of downloading reprogramming data from a computer to a personal information device in the form of a PCMCIA card, comprising the steps of:

directly accessing a first memory of the personal information device by a computer via a PCMCI I/O port of the personal information device when the PCMCIA I/O port of the personal information device is coupled to a PCMCIA port of the computer;

storing reprogramming data supplied from the computer in the first memory, the reprogramming data including reprogramming code and application code therein;

transferring to a second memoir of the personal information device the reprogramming code stored in the first memory;

executing the reprogramming code stored in the second memory; and programming a third memory utilizing the application code under the control of the executed reprogramming code.

16. The method of claim 15, wherein the third memory is an auto-erase type flash memory; and the step of programming the third memory is carried out by programming the flash memory with the application code stored in the first memory.

17. The method of claim 15, wherein the third memory is a flash memory; and the step of programming the third memory is carried out by erasing the flash memory before programming the flash memory with the application code stored in the first memory.

18. The method of claim 15, wherein the flash memory includes therein a device ID identifying a type of the flash memory; the step of executing the reprogramming code includes the step of querying the flash memory to identify the type of the flash memory, and erasing of the flash memory is carried out in accordance with the identified type of the flash memory.

19. The method of claim 15, wherein the personal information device includes a power source; the method further comprising the step of ascertaining a level of said power source; and wherein the steps of erasing and programming the third memory are carried out only if the ascertained level of said power source is above a predetermined threshold.

20. The method of claim 15, further comprising the step of executing the application code programmed into the third memory after the third memory is programmed in accordance with the executed reprogramming code.

21. The method of claim 15, wherein the step of executing the reprogramming code includes the step of diagnosing the application code stored in the first memory; and the programming step is carried out only upon a successful diagnostic of the application code.

22. The method of claim 15, wherein the reprogramming data supplied from the computer includes code update data identifying that said reprogramming data includes reprogramming code; said method further comprising the step of detecting the code update data stored in the first memory; and wherein the step of transfer the reprogramming code to said second memory is carried out only after the code update data is detected.

23. The method of claim 15, further comprising the steps of receiving user information supplied by a user directly to an input device of the personal information device, displaying information on a flat panel display of the personal information device that is visible to the user, executing the application code programmed into the third memory; and responding to the user-supplied information and controlling the information displayed on the flat panel display in accordance with the executed application code.

24. The method of claim 23, wherein the step of executing the application code is carried out after the third memory is programmed.

25. The method of claim 15, wherein the storing step is carried out by storing first reprogramming data supplied from the computer in the first memory, the first reprogramming data including first application code and first reprogramming code; the transferring step is carried out by transferring to the second memory the first reprogramming code stored in the first memory; the executing step is carried out by executing the first reprogramming code stored in the second memory; and the programming step is carried out by partially programming the third memory utilizing the first application code in accordance with the executed first reprogramming code;

and after the programming step is carried out, said method repeating the storing, transferring, executing and programming steps using second reprogramming data supplied from the computer, said second reprogramming data including second application code and second reprogramming code.

26. The method of claim 25, further comprising the step of detecting when the personal information device is disconnected from the computer; and wherein the first transferring step is carried out only after the personal information device is disconnected from the computer; and the second storing step is carried out only after the personal information device is reconnected to the computer.

27. A docking station for coupling and for providing for data communication between a personal information device communicating at a first baud rate and a computer communicating at a second baud rate different from said first baud rate, comprising:

a PCMCIA port adapted to be coupled to a PCMCIA I/O port of said personal information device;

a serial connector adapted to be coupled to an I/O port of said computer; and a controller coupled to said PCMCIA port and said serial connector and operable to supply and receive data to and from said personal information device and said computer via said PCMCIA port and said serial connector, said controller, when serial data is to be supplied from one of said computer and said personal information device to the other of said computer and said personal information device, receiving a plurality of framed bytes supplied by said one of said computer and said personal information device, each of said framed bytes including a respective plurality of bits, each of said bits of a respective framed byte being received at a respective instruction cycle of said controller in accordance with a predetermined routine of said controller, buffering selected ones of said bits of each respective framed byte;

adding at least one bit to each of said framed bytes, and serially supplying to said other of said computer and said personal information device each of said bits of a respective framed byte along with the added at least one bit of the respective framed byte, each of the supplied bits of the respective framed byte being supplied at a respective instruction cycle of said controller, the respective instruction cycles at which the bits of a framed byte are received by said docking station being different from the respective instruction cycles at which the bits of a framed byte are supplied from said docking station.

28. A docking station for coupling and for providing for data communication between a personal information device communicating at a first baud rate and a computer communicating at a second baud rate different from said first baud rate, comprising:

a PCMCIA port adapted to be coupled to a PCMCIA I/O port of said personal information device;

a serial connector adapted to be coupled to an I/O port of said computer; and a controller coupled to said PCMCIA port and said serial connector and operable to supply and receive data to and from said personal information device and said computer via said PCMCIA port and said serial connector, said controller, when serial data is to be supplied from one of said computer and said personal information device, to the other of said computer and said personal information device, receiving a plurality of framed bytes supplied by said one of said computer and said personal information device, each of said framed bytes including a respective plurality of bits, each of said bits of a respective framed byte being received at a respective instruction cycle of said controller in accordance with a predetermined routine of said controller, buffering selected ones of said bits of each respective framed byte;

adding at least one bit to each of said framed bytes, and serially supplying to said other of said computer and said personal information device each of said bits of a respective framed byte along with the added at least one bit of the respective framed byte, each of the supplied bits of the respective framed byte being supplied at a respective instruction cycle of said controller, said controller, when serial data is to be supplied from said other of said personal information device and said computer to said one of said personal information device and said computer, being operable to:

serially receive a plurality of framed bytes supplied by said other of said personal information device and said computer, each of said framed bytes including a respective plurality of bits, each of said bits of a respective framed byte being received at a respective instruction cycle of said controller in accordance with a predetermined routine of said controller, buffer selected ones of said bits of each respective framed byte, remove at least one of said bits from each of said framed bytes, and serially supply to said one of said personal information device and said computer each of said framed bytes having at least one bit removed therefrom, each of the bits of a respective supplied framed byte being supplied at a respective instruction cycle of said controller.

29. A method of providing for data communication between a personal information device communicating at a first baud rate and a computer communicating at a second baud rate different from said first baud rate, comprising the steps of:

receiving serially supplied data from one of said personal information device and said computer, the received data including a plurality of framed bytes, each of said framed bytes including a respective plurality of bits, and each of said bits of a respective framed byte being received at a respective instruction cycle of a predetermined routine;

buffering selected ones of said bits of each respective framed byte;

adding at least one bit to each of said framed bytes;

serially supplying to the other of said personal information device and said computer each of said bits of a respective framed byte along with the added at least one bit of the respective framed bytes, each of the supplied bits of the respective framed byte being supplied at a respective instruction cycle of said predetermined routine;

serially receiving a plurality of framed bytes supplied by said other of said personal information device and said computer, each of said framed bytes including a respective plurality of bits, each of said bits of a respective framed byte being received at a respective instruction cycle of said predetermined routine;

buffering selected ones of said bits of each respective framed byte;

removing at least one of said bits from each of said framed bytes; and serially supplying to said one of said personal information device and said computer each of said framed bytes having at least one bit removed therefrom, each of the bits of a respective supplied framed byte being supplied at a respective instruction cycle of said predetermined routine.

30. A personal information device system, comprising:

a personal information device in the form of a PCMCIA card;

a PCMCIA I/O port at one end of the personal information device;

a docking station having a PCMCIA connector adapted to be coupled to said PCMCIA port of said personal information device, and a serial connector adapted to be coupled to an I/O port of a computer;

a docking station controller in said docking station and coupled to said docking station's PCMCIA connector and serial connector, said docking station controller being operable to receive a serial transmission at a first baud rate supplied by a computer coupled to the serial connector of said docking station, and to supply a serial transmission at a second baud rate to said personal information device coupled to said PCMCIA connector of said docking station said first and second baud rates being different;

a memory in said personal information device; and a personal information device controller in said personal information device, said personal information device controller being coupled to said memory and to said PCMCIA I/O port of said personal information device, said personal information device controller being operable to receive the serial transmission supplied from said docking station and to store data represented in said serial transmission in said memory, said docking station controller being operable to serially receive a plurality of framed bytes supplied by said computer, each of said framed bytes including a respective plurality of bits, each of said bits of a respective framed byte being received at a respective instruction cycle of said docking station controller in accordance with a routine of said docking station controller, said docking station controller buffering selected ones of said bits of each respective framed byte, adding at least one bit to each of said framed bytes, and supplying to said personal information device each of said bits of a respective framed byte along with the added at least one bit of the respective framed byte, each of the supplied bits of the respective framed byte being supplied at a respective instruction cycle of said controller.

31. A personal information device system, comprising:

a personal information device in the form of a PCMCIA card;

a PCMCIA I/O port at one end of the personal information device;

a docking station having a PCMCIA connector adapted to be coupled to said PCMCIA port of said personal information device, and a serial connector adapted to be coupled to an I/O port of a computer;

a docking station controller in said docking station and coupled to said docking station's PCMCIA connector and serial connector, said docking station controller being operable to receive a serial transmission at a first baud rate supplied by a computer coupled to the serial connector of said docking station, and to supply a serial transmission at a second baud rate to said personal information device coupled to said PCMCIA connector of said docking station, said first and second baud rates being different;

a memory in said personal information device; and a personal information device controller in said personal information device, said personal information device controller being coupled to said memory and to said PCMCIA I/O port of said personal information device, said personal information device controller being operable to receive the serial transmission supplied from said docking station and to store data represented in said serial transmission in said memory, said docking station controller being operable to receive a plurality of framed bytes supplied by said personal information device, each of said framed bytes including a respective plurality of bits, each of said bits of a respective framed byte being received at a respective instruction cycle of said docking station controller in accordance with a routine of said docking station controller, said docking station controller buffering selected ones of said bits of each respective framed byte, removing at least one of said bits from each of said framed bytes, and supplying to said computer each of said framed bytes having at least one bit removed therefrom, each of the bits of a respective supplied framed byte being supplied at a respective instruction cycle of said docking station controller.

* * * * *